(12) United States Patent
Berrang et al.

(10) Patent No.: US 11,807,350 B2
(45) Date of Patent: *Nov. 7, 2023

(54) MULTI-LAYER BLADDER CONSTRUCT (71) Applicant: ALUULA COMPOSITES INC., Victoria (CA)

(72) Inventors: Peter G. Berrang, Sidney (CA); Richard K. Myerscough, Victoria (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/389,670

(22) Filed: Jul. 30, 2021

(65) Prior Publication Data

US 2021/0354802 A1 Nov. 18, 2021

Related U.S. Application Data (63) Continuation-in-part of application No. 16/499,933, filed as application No. PCT/CA2018/050529 on May 3, 2018, now Pat. No. 11,084,560.

(60) Provisional application No. 62/509,415, filed on May 22, 2017.

(51) Int. Cl.
*B63H 9/067* (2020.01)
*B32B 5/02* (2006.01)
*B32B 27/36* (2006.01)
*B32B 7/022* (2019.01)
*B32B 1/08* (2006.01)
*D03D 1/02* (2006.01)

(Continued)

(52) U.S. Cl.
CPC ............ *B63H 9/0678* (2020.02); *B32B 1/08* (2013.01); *B32B 5/024* (2013.01); *B32B 7/022* (2019.01); *B32B 27/12* (2013.01); *B32B 27/36* (2013.01); *D03D 1/02* (2013.01); *D03D 3/02* (2013.01); *B32B 2250/24* (2013.01); *B32B 2262/02* (2013.01); *B32B 2307/51* (2013.01); *B32B 2307/518* (2013.01); *B32B 2597/00* (2013.01); *D10B 2507/04* (2013.01)

(58) Field of Classification Search
CPC ......... B63H 9/0678; B32B 1/08; B32B 5/024; B32B 7/022; B32B 27/12; B32B 27/36; B32B 2250/24; B32B 2262/02; B32B 2307/51; B32B 2307/518; B32B 2597/00; D03D 1/02; D03D 3/02; D10B 2507/00

See application file for complete search history.

(56) References Cited

U.S. PATENT DOCUMENTS

| | | |
|---|---|---|
| 4,708,078 A | 11/1987 | Legaignoux et al. |
| 5,244,169 A | 9/1993 | Brown et al. |
| 7,104,504 B2 | 9/2006 | Peterson et al. |

(Continued)

*Primary Examiner* — Michael C Miggins (57) ABSTRACT

A multi-layer bladder construct consisting of a non-stretchable outer covering and a stretchable inner bladder. The outer covering has an inner surface and is made from woven polymer fibers having a warp direction and a weft direction. The inner bladder is made from a bi-axially oriented polymer film. The inner bladder has an outer surface area that is smaller than the inner surface area of the outer covering. Upon inflation, the inner bladder stretches and expands until the outer surface of the inner bladder engages the inner surface of the outer covering, whereby a portion of tensile force loading on the outer covering is shared with the inner bladder. A stretchable flexible film is incorporated into the inner bladder in at least one selected location. The stretchable flexible film has an elastic expansion range which is greater that the elastic expansion range of the remainder of the inner bladder.

7 Claims, 9 Drawing Sheets

(51) Int. Cl.
*D03D 3/02* (2006.01)
*B32B 27/12* (2006.01)

(56) References Cited

U.S. PATENT DOCUMENTS

2009/0179112 A1  7/2009  Gu
2014/0070055 A1  3/2014  Stiewe

MULTI-LAYER BLADDER CONSTRUCT

CROSS REFERENCE TO RELATED APPLICATIONS

This application is a Continuation-In-Part of U.S. patent application Ser. No. 16/499,933 filed Oct. 1, 2019, the entirety of which is incorporated by reference herein.

FIELD

There is described a multi-layer bladder construct that was developed for an air-inflated kite used in the sport of kite boarding. It is now realized that this multi-layer bladder construct has wider application.

BACKGROUND

For the extreme sport of kite boarding, the weight and integrity of the bladder is of paramount importance for performance and safety. In kite boarding, sometimes referred to as kite surfing, a person uses a kite, generally having a "C" shape. Such kite shape, also termed "a leading edge (LE) inflatable kite", has a tube that tappers from the leading edge portion to the tips. An oversized elastomeric bladder is contained within the protective tube cover material forming the kite's leading edge tube. The kite's (pressurized) leading edge tube forms a rigid C-shape that is 10 cm-25 cm in diameter in the central portion, reducing in diameter at each tip end. The kite also has with one or more orthogonally aligned abutting struts, each containing a separate bladder, which structure supports the fabric material forming the kite's canopy.

Kites are deflated for packaging and transport. During use, the kite's leading edge tube and strut bladders are inflated to about 13-36 Newtons (3-8 lbs.) above ambient atmospheric pressure. The leading edge bladder and struts can be inflated simultaneously, or separately. Without inflation, or low inflation, a kite becomes floppy in the water, or in the air, with some wind drag, but cannot create a proper aerodynamic shape.

U.S. Pat. No. 4,708,078 by Legaignoux, et. al. teaches the first use of a kite design that can be re-launched from the water surface, which key innovation spurred the sport of kite boarding. Subsequent innovations seek to improve on re-launching the kite from the water surface, such as, for example, U.S. Pat. No. 7,104,504 B2 by Peterson et al. which describes a system whereby the kite rider can use a dedicated line (or piggybacking onto one of the existing lines) to adjust the kite canopy profile to exhibit different aerodynamic characteristics to facilitate re-launching the kite. However, a key aspect of all kites is weight, as the overall kite weight will determine the ease of re-launch, responsiveness of the kite during riding, and the ability of the kite to fly in light winds.

SUMMARY

There is provided a multi-layer bladder construct consisting of a non-stretchable outer covering and a stretchable inner bladder. The outer covering has an inner surface and is made from woven polymer fibers having a warp direction and a weft direction. The inner bladder is made from a bi-axially oriented polymer film. The inner bladder has an outer surface area that is smaller than the inner surface area of the outer covering. Upon inflation, the inner bladder stretches and expands until the outer surface of the inner bladder engages the inner surface of the outer covering, whereby a portion of the tensile force loading on the outer covering is shared with the inner bladder. A stretchable flexible film is incorporated into the inner bladder in at least one selected location. The stretchable flexible film has an elastic expansion range which is greater that the elastic expansion range of the remainder of the inner bladder.

As will hereinafter be further described, having a stretchable flexible film incorporated into the inner bladder that is more flexible than the remainder of the inner bladder provides a number of advantages.

When there is a tubular section in the multi-layer bladder construct. Making an end cap out of the stretchable flexible film facilitates sealing of an end of the tubular section.

When polymer plastic components, such as valves, are to be attached to the inner bladder. The stretchable flexible film can be used to create an attachment point of compatible materials to facilitate attachment by polymer plastic welding.

When it is necessary to "shape" the inner bladder to fit within the outer covering, the stretchable flexible film can be used to create a hinge point to facilitate shaping of the inner bladder.

When there are certain areas in which greater expansion of the inner bladder is desirable, the stretchable flexible film can be used to create an expansion zone to facilitate greater expansion of the inner bladder within the expansion zone.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A multi-layer bladder construct will now be described with reference to FIG. 1 through FIG. 5. The description will use as an example the multi-layer bladder construct in use with respect to an air-inflatable kite used in the sport of kite boarding. There will then be described with reference to FIG. 6 through FIG. 15 construction details of the bladder construct.

Figure 1:
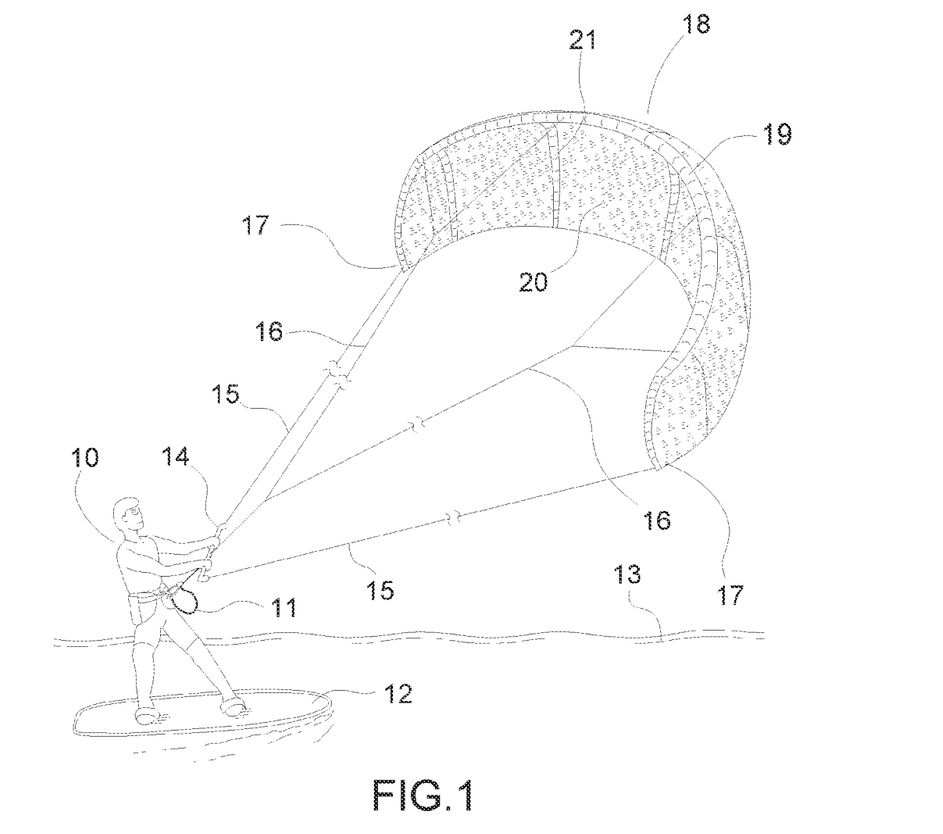
FIG. 1 is a perspective view of an air-inflated kite used in the sport of kiteboarding.

Structure and Relationship of Parts:

FIG. 1 illustrates a kiter 10 engaged in the sport of kite boarding or kite surfing. The kiter stands on a kite board 12 on the water surface 13 holding a control bar 14. Outside (steering) lines 15 are connected near the wingtips 17, and inside lines 16 are also attached to the kite 18 at the distil end. The leading edge tube 19 is inflated, thereby creating a curved rigid structure, with struts 21 supporting the canopy 20 to create aerodynamic lift. Outside lines 15 are connected to control bar 14 to provide for steering the kite. Inside lines 16 are connected at the proximal end to a hook mechanism on the kiter's harness. A safety leash line 11 connects the kiter to one or two of the inside lines to remain tethered to the kite in the event the kiter lets of the control bar and also detaches from the hook connecting the inside lines. The kite 18 is not attached to the board 12. The kiter 10 manoeuvers kite 18 so as to pull the kiter and the board 12 across the surface of the water 13.

Figure 2:
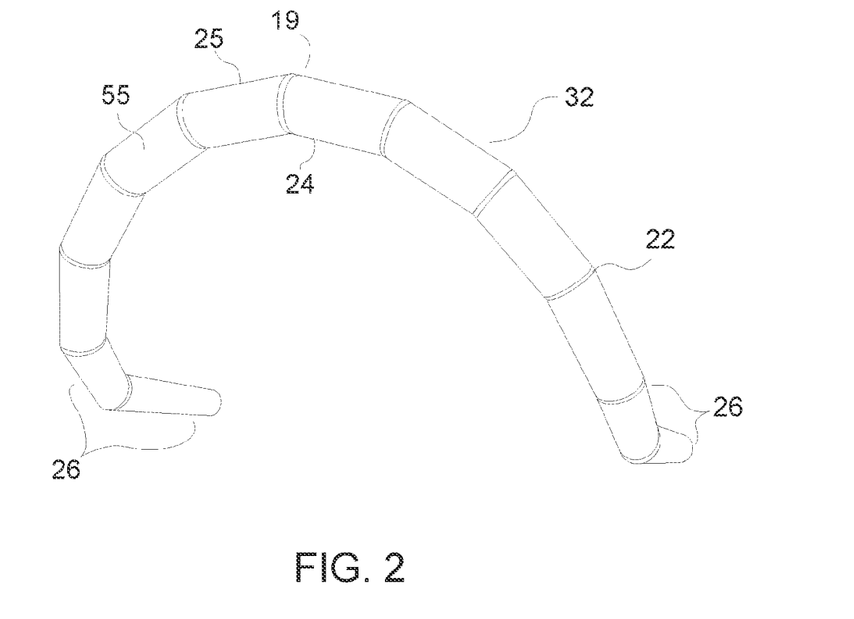
FIG. 2 is a perspective view of an air-inflated leading edge tube of the air-inflated kite illustrated in FIG. 1.

FIG. 2 shows an expanded view of an inflated leading edge tube 19 (without struts or canopy). For clarity, the tip sections, which sections are generally tapered, are shown as 26. The rest of the leading edge tube 19, which tube has a larger diameter, is defined as the "main tube section". To create a curved shape, a non-stretchable outer covering 32 is formed into panels 55 are sewn together at various locations 22, where the length of the inner curved surface 24 is shorter than the outer curved surface 25, thereby causing the leading edge tube 19 to form a curved shape when inflated.

Figure 3:
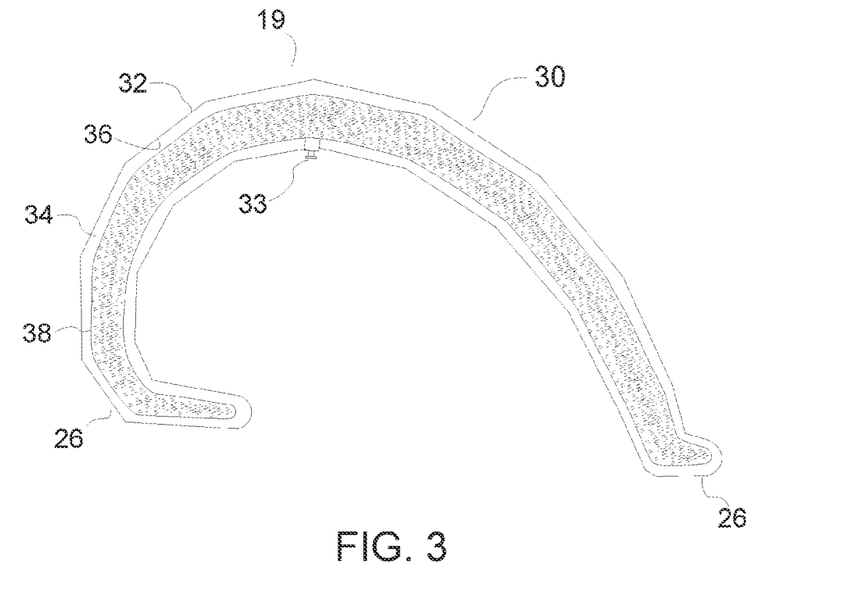
FIG. 3 is a longitudinal section view of the air-inflated leading edge tube illustrated in FIG. 2, prior to inflation.

Referring to FIG. 3, leading edge tube 19 is made from a multi-layer bladder construct 30 consisting of the non-stretchable outer covering 32 and a stretchable inner bladder 34. Outer covering 32 has an inner surface 36. Inner bladder 34 has an outer surface area 38 that is smaller than inner surface 36 of outer covering 32. A valve 33 is provided for the purpose of inflating and deflating inner bladder 34.

Figure 4:
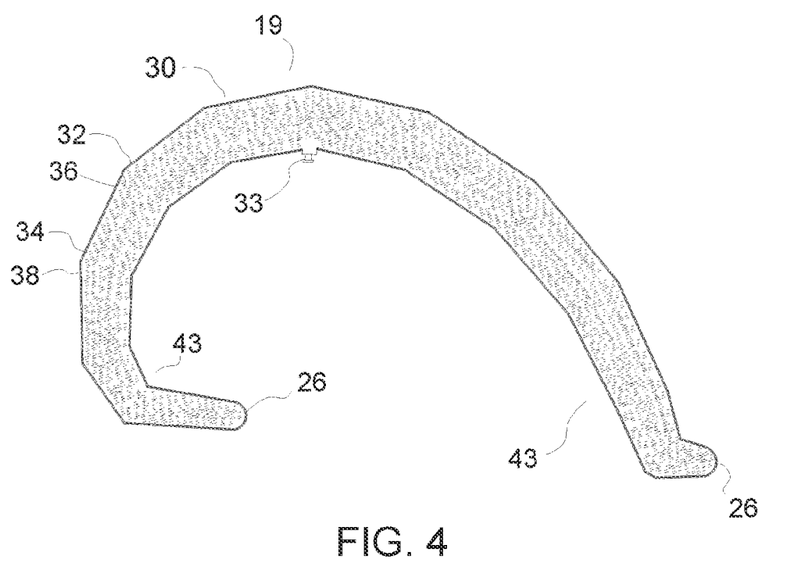
FIG. 4 is a longitudinal section view of the air-inflated leading edge tube illustrated in FIG. 2, after inflation.

Referring to FIG. 4 bladder 34 is shown as inflated, with the outer surface contacting the non-stretchable outer covering 32. Outer covering 32 is made from a woven polymer fabric which fibres are oriented in a warp direction 61 and a weft directions 60 (see FIG. 5). A suitable material for the outer covering 32 is a woven Dacron fabric that is coated with a sealant polymer, and as such, does not significantly stretch in the warp, weft or bias directions.

Figure 5:
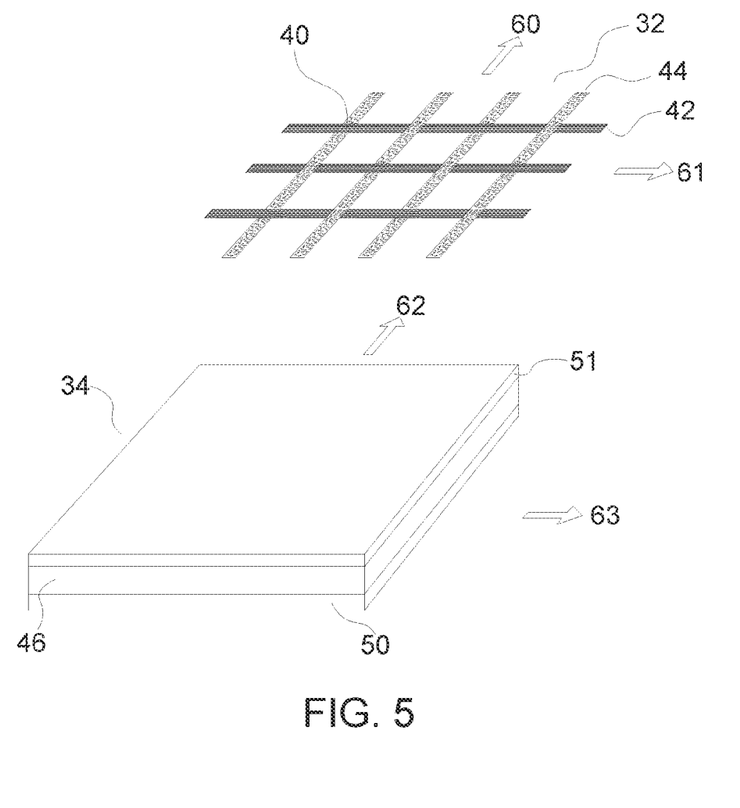
FIG. 5 is an exploded perspective view of an enlarged portion of the outer covering and inner bladder forming the bladder construct used in the air-inflated leading edge tube.

Referring to FIG. 5, inner bladder 34 is made from a bi-axially oriented polymer film 46 having molecular orientation in both a first direction 63 referred to as "Machine Direction (MD)", and a second direction 62, referred to as "Transverse Direction (TD)". Although any biaxially-oriented polymer film, such as, for example, BOPP, BOPE, BOPET, BOPA, PEN or PPS could be used for fabricating the bladder construct, it is preferred to use a biaxially-oriented BOPET film that will result in a bladder construct weighting about 10-70 gsm (grams per square meter), preferably about 20-45 gsm where both sides of such a BOPET film are fused to a (thermoplastic) heat-sealable or fusible layer, shown as 50 and 51, comprised of, for example, a polyethylene, or a polyolefin, a polyurethane, or a co-polymer thereof, or a co-polymer polyamide, with a melting temperature that is 10 C or more below the melting point of the BOPET film. Such biaxially-oriented films are much stronger and resilient in the MD 63 and TD 62 directions than prior art TPU bladder films, allowing for the use of much lighter bladders.

FIG. 5 also illustrates the woven polymer fabric 40 forming outer covering 32, with warp fibers 42 shown in the warp direction 61 and weft fibers 44 in weft direction 60.

Referring to FIG. 5, it is preferred one of the MD 63 or TD 62 direction of the bi-axially oriented polymer film 46 forming inner bladder 34 is aligned with one of fibres 42 in the warp direction 61 or fibres 44 the weft direction 60 of woven polymer fabric 40 forming outer covering 32. This co-alignment of outer covering fibers and oriented polymer bladder serves to increase both the radial and longitudinal tensile strength of the multi-layer bladder construct, as will hereinafter be further explained.

Operation:

Referring to FIG. 3, there is illustrated inner bladder 34 undersized by approximately 1%-5% when the surface area of the bladder is compared to the surface area of the non-stretchable outer covering, When inflated, inner bladder 34 expands within or near its elastic limit with inner bladder 34 thickness thinning during inflation until outer surface 38 of inner bladder 32 engages inner surface 36 of outer covering 32. When this occurs a portion of the tensile force loading on outer covering 32 is shared with inner bladder 34. It is preferred that inner bladder 34, when inflated, shares at least 5% of the tensile force loading on outer covering 32.

The structure of multi-layer bladder construct 30, shown in FIG. 4, greatly reduces the probability of herniation, or material aneurysm, tear or rupture, and when installed undersized, provides part of the tensile force loading of the inflated Dacron fabric leading edge.

By co-aligning, for example, the Dacron fabric warp with the oriented film MD (Machine Direction), and the fabric weft with the film TD (Transverse Direction) such oriented layering adds the tensile strength of both materials add to provide an exceptionally high combined tensile strength construct.

Since the tensile loading of the inflated leading edge is predominately in the radial direction, it is advantageous to orient the layers such that maximum combined tensile strength is in the radial direction.

Such combined tensile strength of the Dacron fabric and the orientated film also provides for the use of a lighter Dacron weave weight in the radial direction, as the loading of the Dacron weave is partially shared with the oriented film, thus allowing for the design of a lighter kite.

Cautionary Warnings:

It has been found that heat sealing a mono-layer of biaxially-oriented polymer film to itself for use as an air-tight bladder is either not possible, depending on the polymer, or, for thermoplastic materials, causes buckling of the film at the seal area, which leads to an imperfect seal and air leakage. Better results have been obtained by applying a heat fusible adhesive layer to one or both sides of the biaxially-oriented polymer film. Such heat fusible films need to have a melting point about 10 C or more below the melting point of the biaxially-oriented polymer.

The prior art uses a highly stretchable TPU film. Undersizing such a elastomeric film is problematic, as this would thin out the film, and be prone to create areas of herniation, pinhole leaks and greatly increase the probability of rupturing the delicate TPU film.

Referring to FIG. 2, it should be noted that leading edge tube 19 has tip sections 26 that are generally tapered. This is a vulnerable area. It is recommended that inner bladder not be undersized at tip section 26 and instead be tapered to conform to tip sections 26 without any, or with minimal, stretch. It is also preferred that the thickness of the inner bladder in the tip area be at least 25% thicker than the inner bladder in the leading edge area.

Commercial Version:

In the course of working on commercial versions of the bladder construct, it was determined that it was desirable to have a stretchable flexible film incorporated into inner bladder 34 in one or more selected locations. The locations where the stretchable flexible film is desirable and the purpose of positioning the stretchable flexible film at those locations will hereinafter be described with reference to FIG. 6 through FIG. 15.

It will be understood that inner bladder 34 is stretchable and flexible. In order to understand the significance of the use of the stretchable flexible film, one must understand that the stretchable flexible film has an elastic expansion range which is greater that the elastic expansion range of the remainder of inner bladder 34. Relative to the bladder material of inner bladder 34, stretchable flexible film is "highly" flexible.

As the stretchable flexible film will be hereinafter described incorporated into inner bladder 34 in different locations, to avoid confusion different reference numerals will be used to identify the stretchable flexible film. It will be understood that it is the same stretchable flexible film, simply located at different locations and for different purposes.

Figure 6:
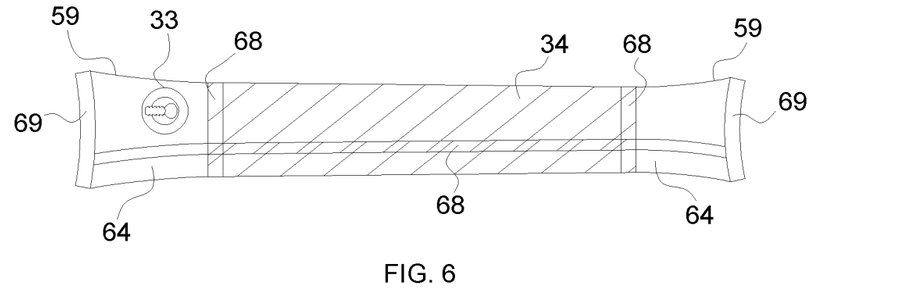
FIG. 6 shows a side elevation view of the bladder construct of FIG. 5, showing tube formation and end cap attachment detail.
Figure 7:
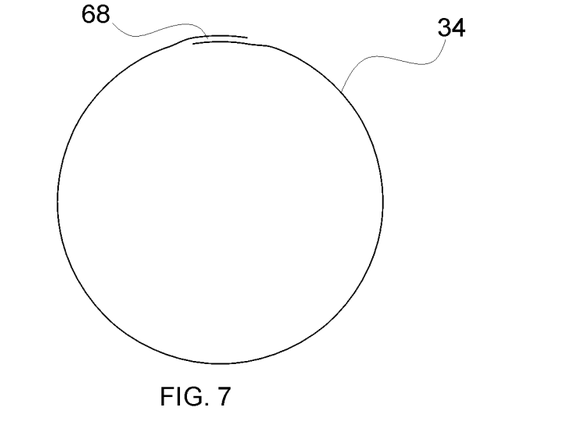
FIG. 7 is a cross section view of the bladder construct of FIG. 6, showing overlap seal seam detail for tube formation.
Figure 8:
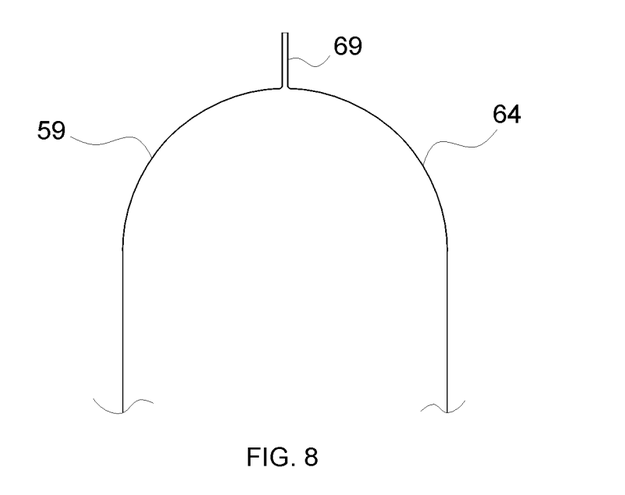
FIG. 8 is a top plan view, in section, of the bladder construct of FIG. 6, showing fin seal seam detail for end cap closure.

Referring to FIG. 6, one location where the stretchable flexible film, identified by reference numeral 64, is preferred at an end cap 59. This is done where inner bladder 34 has a tubular section to facilitate sealing of an end of the tubular section. Referring to FIG. 7 inner bladder 34 is formed into a tubular section with an overlap seal seam 68. Referring to FIG. 6, end cap 59 is also joined into a tubular configuration by overlap seal seam 68. The two tubular sections are also connected in end to end relation by overlap seal seam 68. Referring to FIG. 8, end cap 59 is then sealed by using a fin seal seam 69 to join stretchable flexible film 64.

Figure 9:
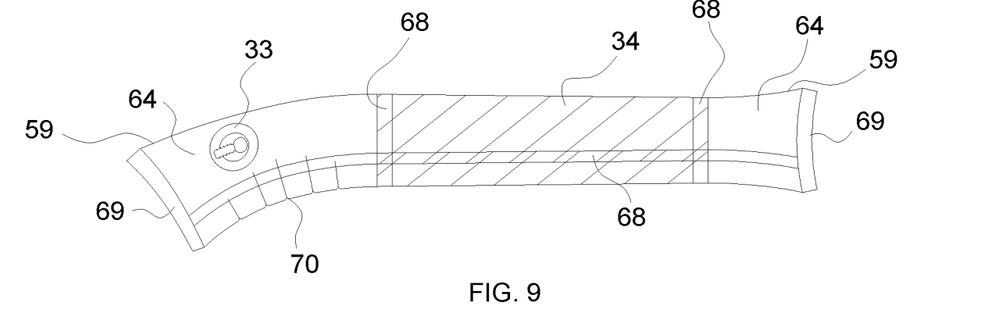
FIG. 9 shows a side elevation view of the bladder construct of FIG. 6, showing flexing about a hinge point created by a flexible film.
Figure 10:
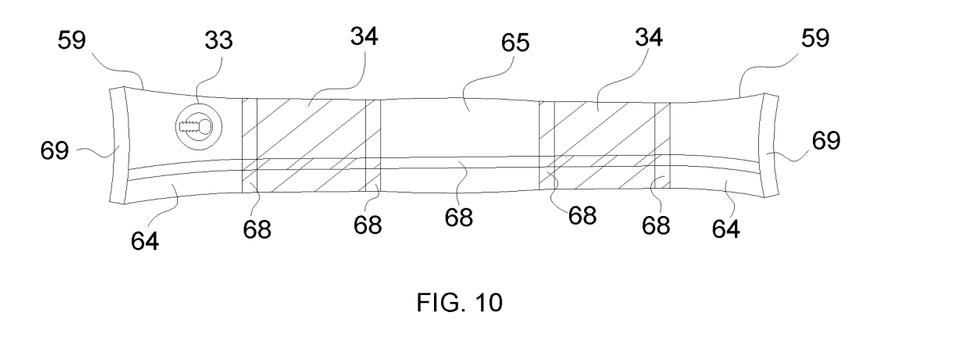
FIG. 10 is a side elevation view of the bladder construct of FIG. 6, with an additional flexible film added to create an additional hinge point.
Figure 11:
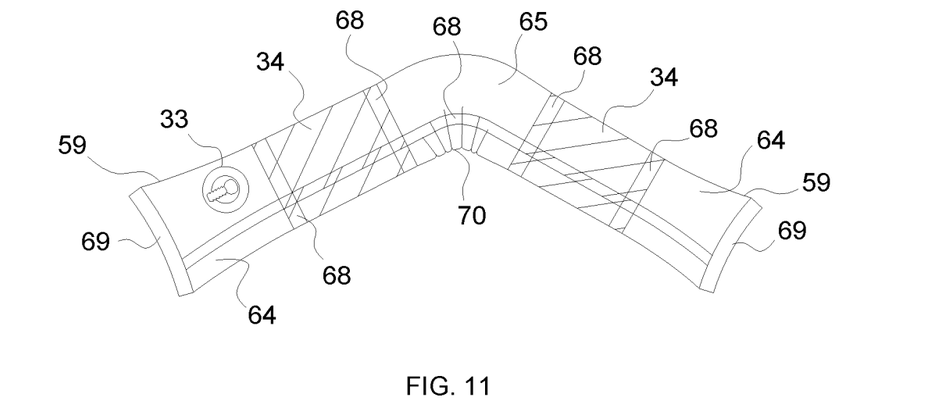
FIG. 11 is a side elevation view of the bladder construct of FIG. 10, showing flexing at the additional hinge point.

Referring to FIG. 10 and FIG. 11, another location where the stretchable flexible film, identified by reference numeral 65, is preferred is at a hinge point 70. This is done to facilitate shaping of inner bladder 34. FIG. 11, shows the flexibility stretchable flexible film 65 provides at hinge point 70. Referring to FIG. 9, it can be seen that using stretchable flexible film 64 on end cap 59 also create a hinge point 70.

Figure 12:
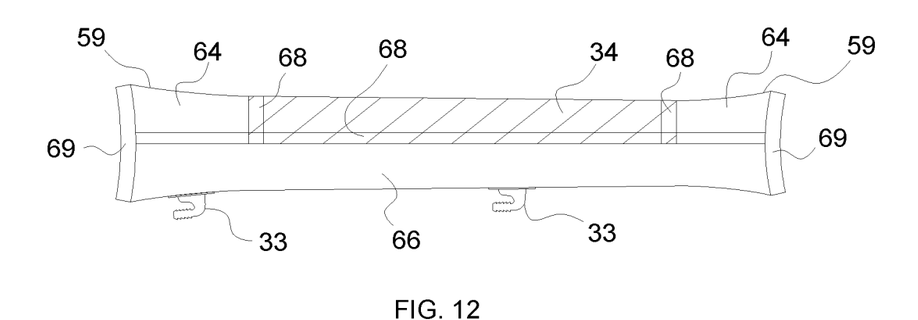
FIG. 12 is a side elevation view of the bladder construct of FIG. 6, having a lengthwise section of flexible film.
Figure 15:
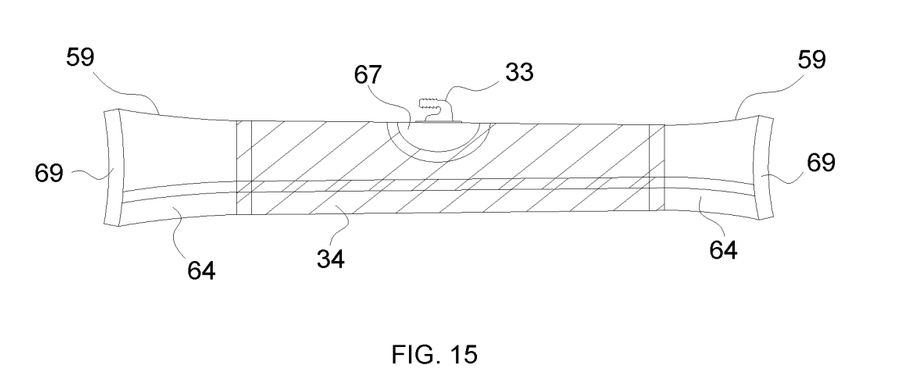
FIG. 15 is a side elevation view of the bladder construct of FIG. 6, with an inset section of highly flexible film to accommodate a valve.

Referring to FIG. 12, another location where the stretchable flexible film, identified by reference numeral 66, is preferred is to create an attachment point for a polymer plastic component. This is to facilitate attachment by polymer plastic welding. In order for polymer plastic welding to take place there must be compatible materials. For example, if the polymer plastic component is made from polyurethane, it is preferrable that stretchable flexible film be made from polyurethane. The polymer plastic component chosen for illustration is a valve 33. It will be appreciated that there could be other polymer plastic components that one may wish welded onto inner bladder 34. Referring to FIG. 6, all of end cap 59 is made from stretchable flexible film 64. It is to be noted that this enables a valve to be incorporated into inner bladder 34 at end cap 59 by attachment through polymer plastic welding to stretchable flexible film 64. Referring to FIG. 15, it is to be noted that the same result may be obtained by through the use of a relatively smaller inset section of stretchable flexible film 67. This inset section of stretchable flexible film 67 is just large enough to define an area to which valve 33 is attached.

Figure 13:
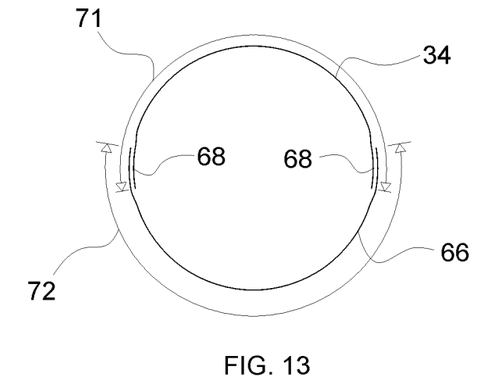
FIG. 13 is a cross section view of the bladder construct of FIG. 12.
Figure 14:
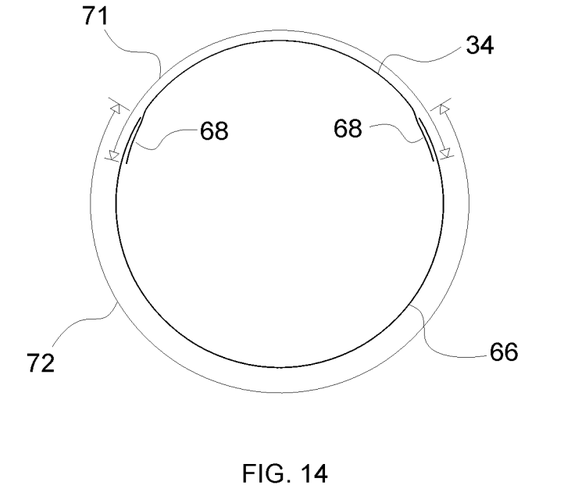
FIG. 14 is a cross section view of the bladder construct of FIG. 13 in an expanded state.

Referring to FIG. 13 and FIG. 14, another location where the stretchable flexible film, identified by reference numeral 72, is used to create an expansion zone. The bladder material of inner bladder 34 is identified by reference numeral 71. Bladder 71 has a given ability to expand. However, bladder material 71 may be joined with overlap seal seams 68 to stretchable flexible film 72 to form a tubular configuration. Referring to FIG. 14, there is shown FIG. 13 in an expanded state. In the expanded state a circumference of the stretchable flexible film 72 increases substantially relative to the circumference of bladder material 71 which expands less.

The foregoing examples illustrate the advantages to be gain by incorporating a stretchable flexible film into inner bladder 34.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A multi-layer bladder construct, comprising:
a non-stretchable outer covering having an inner surface, the outer covering is comprised of a woven polymer fabric having a warp direction and a weft direction;
a stretchable inner bladder having an outer surface, the inner bladder being comprised of a bi-axially oriented polymer film having opposed sides, the polymer film having a film machine direction and a film transverse direction orthogonal to the film machine direction, the polymer film having an elastic expansion range within which the inner bladder expands outwardly and then returns to it's uninflated size after inflation;
a sealing layer bonded to at least one of the opposed sides of the polymer film forming the inner bladder, thereby making the inner bladder heat sealable to itself to make it air-tight;
wherein one of the film machine direction or the film transverse direction of the polymer film forming the inner bladder is aligned with one of the warp direction or the weft direction of the woven polymer fabric forming the outer covering;
wherein a surface area of the outer surface of the inner bladder is smaller than a surface area of the inner surface of the outer covering, such that, upon inflation, the inner bladder stretches and expands outwardly within the elastic expansion range until the outer surface of the inner bladder engages the inner surface of the outer covering, whereby a portion of tensile force loading on the outer covering is shared with the inner bladder; and wherein a stretchable flexible film is incorporated into the inner bladder in at least one selected location, the stretchable flexible film having an elastic expansion range which is greater that the elastic expansion range of the remainder of the inner bladder.

2. The multi-layer bladder construct of claim 1, wherein there is a tubular section in the multi-layer bladder construct and the at least one selected location is at an end cap to facilitate sealing of an end of the tubular section.

3. The multi-layer bladder construct of claim 1, wherein the at least one selected location is to create a hinge point to facilitate shaping of the inner bladder.

4. The multi-layer bladder construct of claim 1, wherein the at least one selected location is to create an expansion zone where additional expansion of the inner bladder is desired.

5. The multi-layer bladder construct of claim 1, wherein the outer covering forms a leading edge tube of an air-inflated kite used in the sport of kite boarding.

6. The multi-layer bladder construct of claim 1, wherein the at least one selected location is at an attachment point for a polymer plastic component to facilitate attachment by polymer plastic welding.

7. The multi-layer bladder construct of claim 6, wherein the polymer plastic component is a valve.

\* \* \* \* \*